US006258288B1

(12) United States Patent
Miyoshi et al.

(10) Patent No.: US 6,258,288 B1
(45) Date of Patent: Jul. 10, 2001

(54) COMPOSITION COMPRISING LONG CHAIN DIBASIC ACIDS AND ELECTROLYTIC SOLUTION USING THEREOF

(75) Inventors: Noritaka Miyoshi; Kazuhisa Takii; Masashi Uehata, all of Osaka-Prefecture (JP)

(73) Assignee: Okamura Oil Mills, Ltd. (JP)

( * ) Notice: Subject to any disclaimer, the term of this patent is extended or adjusted under 35 U.S.C. 154(b) by 0 days.

(21) Appl. No.: 09/431,540

(22) Filed: Oct. 29, 1999

(30) Foreign Application Priority Data

Nov. 26, 1998  (JP) .................................................. 10-335706

(51) Int. Cl.⁷ .................................................. C07C 55/02
(52) U.S. Cl. ........................ 252/62.2; 361/504; 361/505; 361/506
(58) Field of Search ........................... 252/62.2; 361/504, 361/505, 506

(56) References Cited

U.S. PATENT DOCUMENTS 4,469,610 * 9/1984 Fukuda et al. ....................... 252/62.2
4,629,807  12/1986 Knifton ............................... 560/204

FOREIGN PATENT DOCUMENTS

| 60-13293 | 4/1981 | (JP) . |
| 2-741397 | 9/1990 | (JP) . |
| 3-74827 * | 3/1991 | (JP) . |
| 4-186713 | 7/1992 | (JP) . |
| 11-26313 * | 1/1999 | (JP) . |

* cited by examiner

Primary Examiner—C. Melissa Koslow
(74) Attorney, Agent, or Firm—Amin & Turocy, LLP

(57) ABSTRACT

A mixture of long-chain dibasic acids comprising one or more long-chain dibasic acid having an alkyl group at its side chain and one or more long chain dibasic acid having a carbon chain of 8 or more carbon atoms between both its carboxyl groups and having an alkyl group and one or more alkoxycarbonyl group at its side chain is provided. This mixture can be used as the electrolyte of an electrolytic solution for electrolytic capacitors. This electrolytic solution can be produced very simply, hardly raises any precipitation at low temperatures and is tolerant to high voltage.

10 Claims, No Drawings

COMPOSITION COMPRISING LONG CHAIN DIBASIC ACIDS AND ELECTROLYTIC SOLUTION USING THEREOF

BACKGROUND OF THE INVENTION

1. Field of the Invention

The present invention relates to a mixture of long chain dibasic acids, a composition for an electrolytic solution for electrolytic capacitors using thereof, and the electrolytic solution for electrolytic capacitors.

2. Description of the Related Art

As a conventional electrolytic solution for electrolytic capacitors, especially as a middle and high voltage electrolytic solution for electrolytic capacitors, a solution containing ethylene glycol as a solvent and boric acid or its ammonium salt as a electrolyte is used. However, this type of electrolytic solution has problems in that the water content becomes high; that is, water is easily eliminated from the boric acid to form metaboric acid, and furthermore, water is formed from the esterification reaction between the boric acid and ethylene glycol. Thus, the water content of the electrolytic solution becomes high. As a result, when the electrolytic solution is used at a temperature over 100° C., the water in the electrolytic solution is vaporized, thereby causing an increase in the inner pressure of the electrolytic capacitor which destroys the capacitor.

In order to remedy the aforementioned problems, electrolytic solutions containing saturated linear dicarboxylic acids such as azelaic acid, sebacic acid, dodecanedioic acid or the salts thereof as a electrolyte have been used. However, since the solubility of the saturated linear dicarboxylic acid to a solvent, such as ethylene glycol, is low, the saturated linear dicarboxylic acid has a tendency to be crystallized at low-temperatures. By the crystallization, excess electric current may be caused, thereby deteriorating the low-temperature characteristics. Thus, the above mentioned problems are not solved yet.

Moreover, experiments using a dibasic acid as an electrolyte have been performed. As the dibasic acid, 2-butyloctanedioic acid (Japanese laid-open patent publication No. 60-13293), 8-vinyl-10-octadecenedioic acid (Japanese laid-open patent publication No. 4-186713) and 2-methylnonanedioic acid (Japanese laid-open patent publication No. 2-224217) or salts thereof are disclosed. These dibasic acids or salts thereof are useful since the solubility of these dibasic acids or salts thereof to a solvent, such as ethylene glycol, is improved compared to the aforementioned saturated linear dibasic acids or salts thereof.

Among the dibasic acids, 2-methylnonanedioic acid is a useful long chain dibasic acid. This dibasic acid can be produced by dicarboxylation of 1,7-octadiene in the presence of a palladium-phosphine catalyst (U.S. Pat. No. 4,629,807). However, according to this method, this dibasic acid can be obtained in a yield of only 19.1%. Therefore, by this method, an electrolytic solution having the desired ability cannot be produced.

Moreover, even if 2-methylnonanedioic acid could be fully supplied, the low-temperature characteristics may not be improved because the problems of the crystallization of the electrolyte at low temperatures are not yet solved. Therefore, improvement on the low temperature characteristics is desired.

Therefore, an electrolytic solution for electrolytic capacitors which comprises a long chain dibasic acid having an alkyl group at its side chain (e.g., 2-methylnonanedioic acid) as a main electrolyte but which does not cause any crystallization of the electrolyte is desired.

In view of the above, the present inventors have conducted extensive studies on the improvement of the low-temperature characteristics of the electrolytic solution using 2-methylnonanedioic acid. As a result, the present inventors have found that when one or more long chain dibasic acid having a carbon chain of 8 or more carbon atoms between both its carboxyl groups and having at its side chain an alkyl group and one or more alkoxycarbonyl group is mixed with 2-methylnonanedioic acid, the mixture can be a desirable electrolytic solution for electrolytic capacitors in that crystallization of the electrolyte hardly occurs at low temperatures; electrical conductivity is not reduced even at high temperatures; and high-voltage resistance can be improved. Thus, the present inventors accomplished the present invention.

SUMMARY OF THE INVENTION

The present invention relates to a mixture of long chain dibasic acids comprising one or more long chain dibasic acid (a first dibasic acid) having an alkyl group at its side chain and one or more long chain dibasic acid (a second dibasic acid) having a carbon chain of 8 or more carbon atoms between both its carboxyl groups and having at its side chain an alkyl group and one or more alkoxycarbonyl group.

In a preferred embodiment, the mixture of long chain dibasic acids comprises one or more long chain dibasic acid that contains 2 or more alkoxycarbonyl groups.

In a preferred embodiment, the alkoxycarbonyl group is a methoxycarbonyl group.

In a preferred embodiment, the mixture contains 2-methylnonanedioic acid, 2,4-dimethyl-4-methoxycarbonylundecanedioic acid, 2,4,6-trimethyl-4,6-dimethoxycarbonyltridecanedioic acid and 8,9-dimethyl-8,9-dimethoxycarbonylhexadecanedioic acid.

In a more preferred embodiment, 2-methylnonanedioic acid, 2,4-dimethyl-4-methoxycarbonylundecanedioic acid, 2,4,6-trimethyl-4,6-dimethoxycarbonyltridecanedioic acid and 8,9-dimethyl-8,9-dimethoxycarbonylhexadecanedioic acid are contained in the mixture at a ratio of 30 to 60:8 to 20:8 to 20:15 to 30 based on weight based on the total weight of the dibasic acids.

In a preferred embodiment, the mixture of long chain dibasic acids is obtained by the following method comprising the steps of:

(1) reacting hydrogen peroxide with cyclohexanone in methanol in the presence of an acid catalyst;

(2) reacting methyl methacrylate with the product of step (1) in the presence of metal salt; and (3) hydrolyzing the reaction product of the step (2).

The present invention also relates to a composition for an electrolytic solution comprising a mixture of long chain dibasic acids and/or salts thereof of any one of the above long chain dibasic acids.

In a preferred embodiment, the salt is an ammonium salt.

In a more preferred embodiment, the long chain dibasic acid and/or ammonium salt thereof is dissolved in ethylene glycol.

The present invention also relates to an electrolytic solution for electrolytic capacitors which comprises a mixture of long chain dibasic acids and/or salt thereof.

In a preferred embodiment, the salt is an ammonium salt.

In a preferred embodiment, the dibasic acid and/or ammonium salt thereof is dissolved in ethylene glycol.

Further, the present invention relates to a method for producing a mixture of long chain dibasic acids, wherein the mixture comprises one or more long chain dibasic acid (a first dibasic acid) having an alkyl group at its side chain and one or more dibasic acid (a second dibasic acid) having a carbon chain of 8 or more carbon atoms between both its carboxyl groups and having at its side chain an alkyl group and one or more alkoxycarbonyl group, and wherein the method comprises the following steps of:

(1) synthesizing a mixture of long chain dibasic acid-esters by reacting an alkyl-substituted cycloalkanone and an alkyl methacrylate,
wherein the alkyl-substituted cycloalkanone has the following general formula I:

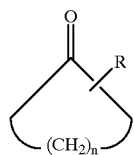

(I)

wherein n is an integer of 2 to 4, and R is H or a lower alkyl group having carbon number 1 to 4, wherein the alkyl group can be straight or branched; and (2) obtaining a mixture of long chain dibasic acids by hydrolyzing the thus-obtained long chain dibasic acid-esters.

Moreover, the present invention relates to a method for producing a composition for an electrolytic solution, wherein the composition comprises one or more long chain dibasic acid and/or ammonium salt thereof having an alkyl group at its side chain and one or more long chain dibasic acid (a first dibasic acid) and/or ammonium salt thereof having a carbon chain of 8 or more carbon atoms between both its carboxyl groups and having at its side chain an alkyl group and one or more alkoxycarbonyl group, and wherein the method comprises the following steps of:

(1) synthesizing a mixture of long chain dibasic acid-esters by reacting an alkyl-substituted cycloalkanone and an alkyl methacrylate, wherein the alkyl-substituted cycloalkanone has the general formula I:

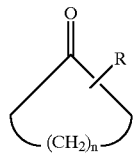

(I)

wherein n is an integer of 2 to 4, and R is H or a lower alkyl group having carbon number 1 to 4, wherein the alkyl group can be straight or branched; and (2) producing a mixture of long chain dibasic acids by hydrolyzing the thus-obtained long chain dibasic acid-esters; and (3) treating the thus-obtained mixture of long chain dibasic acids with ammonia.

Further, the present invention relates to a method for producing an electrolytic solution for electrolytic capacitors, wherein the solution comprises one or more long chain dibasic acid (a first dibasic acid) having an alkyl group at its side chain and one or more long chain dibasic acid (a second dibasic acid) having a carbon chain of 8 or more carbon atoms between both its carboxyl groups and having at its side chain an alkyl group and one or more alkoxycarbonyl group, and wherein the method comprises the following steps of:

(1) synthesizing a mixture of long chain dibasic acid-esters by reacting an alkyl-substituted cycloalkanone and an alkyl methacrylate, wherein the alkyl-substituted cycloalkanone has the following general formula (1):

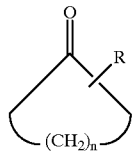

(I)

wherein n is an integer of 2 to 4, and R is H or a lower alkyl group having carbon number 1 to 4, wherein the alkyl group can be straight or branched; and (2) producing a mixture of long chain dibasic acids by hydrolyzing the thus-obtained long chain dibasic acid-esters;

(3) treating the thus-obtained mixture of long chain dibasic acids with ammonia; and (4) dissolving the thus-obtained mixture of long chain dibasic acids and/or ammonium salt thereof in a solvent.

Thus, the invention described herein makes possible the advantages of:

(1) providing an electrolytic solution for electrolytic capacitors that may not cause any crystallization at low temperatures;

(2) providing an electrolytic solution for electrolytic capacitors that is superior in high-voltage tolerance; and (3) providing a method for producing the electrolytic solution for the electrolytic capacitors by a very simple method.

These and other advantages of the present invention will become apparent to those skilled in the art upon reading and understanding the following detailed description.

DESCRIPTION OF THE PREFERRED EMBODIMENT

A mixture of long chain dibasic acids of the present invention comprises one or more long chain dibasic acid (a first dibasic acid) having an alkyl group at its side chain and one or more dibasic acid (a second dibasic acid) having a carbon chain of 8 or more carbon atoms between both its carboxyl groups and having at its side chain an alkyl group and one or more alkoxycarbonyl group.

Having an alkyl group and an alkoxycarbonyl group at its side chain, each molecule of the second long chain dibasic acid is polarized. As a result, the solubility of the dibasic acid to a solvent can be improved and tolerance to the high voltage of an electrolytic solution can be improved when the electrolytic solution containing the dibasic acid is used for electrolytic capacitors.

The long chain dibasic acid having an alkyl group and one or more alkoxycarbonyl group at its side chain preferably has a carbon chain of 8 to 21 carbon atoms between both its carboxyl groups. The number of carbon atoms is more preferably 8 to 15, and further preferably 9 to 12.

As the side chain alkyl group of the first and second dibasic acids, lower alkyl groups that may be straight or branched can be preferable. To avoid excess hydrophobicity, a methyl group, an ethyl group, a propyl group, a butyl group or an isopropyl group is preferable as the alkyl group. The number of alkyl groups of the side chain is preferably 2 or more.

As the alkoxycarbonyl group of the side chain, a lower alkoxycarbonyl group is preferred. To avoid excess hydrophobicity, a methoxycarbonyl group, an ethoxycarbonyl group, a propoxycarbonyl group, a buthoxycarbonyl group or an isopropoxycarbonyl group is preferable as the alkoxycarbonyl group. The methoxycarbonyl group is the most preferable. The number of alkoxycarbonyl groups in the second dibasic acid is preferably 1 to 4.

The kind and number of the alkyl groups and the alkoxycarbonyl groups in the second dibasic acid can be determined based on the carbon number of the second dibasic acid to be used.

The long chain dibasic acid having an alkyl group at its side chain (the first dibasic acid) can be 2-methyloctanedioic acid, 2-methylnonanedioic acid, or 2-methyldecanedioic acid.

The long chain dibasic acid having an alkyl group and one or more alkoxycarbonyl group at its side chain (the second dibasic acid) can be such as 2,4-dimethyl-4-methoxycarbonyldecanedioic acid, 2,4,6-trimethyl-4,6-dimethoxycarbonyldodecanedioic acid, 7,8-dimethyl-7,8-dimethoxycarbonyltetradecanedioic acid, 2, 4-dimethyl-4-methoxycarbonylundecanedioic acid, 2,4,6-trimethyl-4,6-dimethoxycarbonyltridecanedioic acid, 8,9-dimethyl-8,9-dimethoxycarbonylhexadecanedioic acid, 2,4-dimethyl-4-methoxycarbonyldodecanedioic acid, 2,4,6-trimethyl-4,6-dimethoxycarbonyltetradecanedioic acid, or 9,10-dimethyl-9,10-dimethoxycarbonyloctadecanedioic acid.

A mixture of the long chain dibasic acids of the present invention can be produced by mixing a long chain dibasic acid having an alkyl group at its side chain (the first dibasic acid) and one or more, preferably 3, of the long chain dibasic acids (the second dibasic acid) having an alkyl group and one or more alkoxycarbonyl group at its side chain.

An example of a mixture of the long chain dibasic acids of the present invention is a mixture of 2-methylnonanedioic acid, 2,4-dimethyl-4-methoxycarbonylundecanedioic acid, 2,4,6-trimethyl-4, 6-dimethoxycarbonyltridecanedioic acid and 8, 9-dimethyl-8, 9-dimethoxycarbonylhexadecanedioic acid. Preferably, the above compound can be included in the long chain dibasic acid mixture at a ratio of about 30 to 60:8 to 20:8 to 20:15 to 30, respectively, based on weight. Outside of this range, the high-voltage tolerance of the electrolytic solution which contains the mixture is apt to be decreased and crystals of the electrolyte also tend to be precipitated.

The long chain dibasic acid mixture of the present invention can also be obtained by reacting an alkyl-substituted cycloalkanone and an alkyl methacrylate so as to obtain a mixture of esters of long chain dibasic acids, and hydrolyzing the thus-obtained mixture of long chain dibasic acid-esters.

The alkyl-substituted cycloalkanone having the following general formula (I) can preferably be used in the present invention.

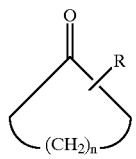

(I)

wherein n is an integer of 2 to 4, and R is H or a lower alkyl group having a carbon number 1 to 4, wherein the alkyl group can be straight or branched. As the lower alkyl group, a methyl group, an ethyl group, a propyl group or an isopropyl group is preferred. R can be a butyl group. As the cycloalkanone of the formula I, cyclopentanone, cyclohexanone, cycloheptanone and alkyl-substituted derivatives thereof can be used.

As the alkyl group of the alkylmethacrylate, a lower alkyl group that may be straight or branched is preferred. For example, a methyl group, an ethyl group, a propyl group, an isopropyl group or a butyl group is preferred. The length of the alkyl group and whether the alkyl group is straight or branched may effect the solubility of the resultant long chain dibasic acid to a solvent. As the alkyl methacrylate, methyl methacrylate, ethyl methacrylate, propyl methacrylate, and isopropyl methacrylate is preferably used.

The second long chain dibasic acid can be synthesized by reacting an alkyl-substituted cycloalkanone and an alkyl methacrylate: that is, an alkyl-substituted cycloalkanone and hydrogen peroxide are reacted in alcohol (preferably, methanol) in the presence of an acid catalyst; then the reaction product is further reacted with alkyl methacrylate in the presence of a metal salt so as to form the long chain dibasic acid-esters; and finally, the formed long chain dibasic acid-esters are hydrolyzed.

As the acid catalyst, sulfuric acid, hydrochloric acid, phosphoric acid, and trifluoroacetic acid can be used. The sulfuric acid or phosphoric acid is especially suitable. The amount of the alkyl-substituted cycloalkanone and hydrogen peroxide to be used is not limited. However, usually, about 80 to 130 parts by weight (hereinafter referred to as "parts") and preferably about 100 to 110 parts of hydrogen peroxide can be used against 100 parts of the alkyl-substituted cycloalkanone. About 200 to 700 parts and preferably about 250 to 350 parts of alcohol (preferably, methanol) can be used against 100 parts of the alkyl-substituted cycloalkanone. About 5 to 10 parts and preferably about 6 to 8 parts of acid catalyst can be used against 100 parts of the alkyl-substituted cycloalkanone. This reaction proceeds under a low temperature. Usually, the reaction can be conducted preferably at about −20° C. to 10° C., and completed in a short period.

An alkyl-substituted cycloalkanemethoxyperoxide is formed in the above-mentioned reaction as an intermediate. This product is usually provided for the next reaction without isolation.

The product is reacted with alkyl methacrylate in the presence of a metal salt. As the metal salt, sulfate, chloride or the ammonium salt of Fe, Cu, Co, Ti, and Sn or the hydrate thereof can be used. Among them, ferrous salt is most preferable. As the ferrous salt, for example, ferrous sulfate, ferrous chloride and ammonium iron (II) sulfate and the hydrates thereof can be used. Among them, ferrous sulfate is the most preferable. After the reaction, the ferrous sulfate can be recovered from the reaction mixture by reduction with iron and sulfuric acid. The recovered ferrous sulfate can be re-used. The amount of the alkyl methacrylate can be 70 to 300 parts and preferably 100 to 110 parts against 100 parts of the alkyl-substituted cycloalkanone. By increasing the molar ratio of the alkyl methacrylate and the alkyl-substituted cycloalkanone, the number of alkoxycarbonyl groups to be introduced in the resultant dibasic acid is increased. For example, if methyl methacrylate and cyclohexanone are reacted at a molar ratio of 2:1, the number of methoxycarbonyl groups introduced in the reaction product is 1 to 4. If the molar ratio is increased more than 2:1, more than 4 methoxycarbonyl groups can be introduced.

In order to conduct the reaction of the above-mentioned intermediate with an alkyl methacrylate, the alkyl methacrylate is added to the reaction mixture containing the intermediate, and a solid or powdered metal salt or a solution or dispersion of the metal salt is added dropwise to the resultant mixture. As the solvent of the solution or dispersion, alcohol, especially methanol, is preferably used.

The above reaction proceeds under a low temperature. Usually, the reaction can be conducted at about −20° C. to 10° C., preferably at about −10° C. to 5° C., and is completed within about 0.3 to 2 hours.

By these reactions, a mixture of long chain dibasic acid-esters can be obtained. Hydrolysis of the long chain dibasic acid esters can be performed by a suitable method that can be selected by anyone with ordinary skill in the art.

By using cyclohexanone and methyl methacrylate as starting materials, the mixture including the following long chain dibasic acids of the present invention can be produced: 2-methylnonanedioic acid, 2,4-dimethyl-4-methoxycarbonylundecanedioic acid, 2,4,6-trimethyl-4,6-dimethoxycarbonyltridecanedioic acid and 8,9-dimethyl-8,9-dimethoxycarbonylhexadecanedioic acid. These compounds are usually contained at a ratio of 30 to 60:8 to 20:8 to 20:15 to 30, based on weight, respectively, of the total weight of the dibasic acids. The long chain dibasic acid mixture of the present invention can include a small amount of other long chain dibasic acids.

The thus-obtained mixture of long chain dibasic acids can be treated with ammonia or amine so as to prepare a composition for the electrolytic solution. Preferably, the mixture of long chain dibasic acids can be treated with ammonia. For example, the mixture of long chain dibasic acids is dissolved in a solvent, such as ethylene glycol, γ-butyrolactone, methyl cellosolve or mixtures thereof, in an appropriate concentration. For example, the mixture of long chain dibasic acids may be contained in a solution in an amount of about 10 to 60% by weight, preferably about 15 to 40% by weight, and more preferably about 20% by weight. Into this solution, ammonia gas or amine is bubbled or added until the pH of the solution is about 6 to 8, preferably, about 6.5 to 7.5, thereby obtaining the composition for the electrolytic solution.

The preferred composition for the electrolytic solution of the present invention contains 2-methylnonanedioic acid, 2,4-dimethyl-4-methoxycarbonylundecanedioic acid, 2,4,6-trimethyl-4,6-dimethoxycarbonyltridecanedioic acid and 8,9-dimethyl-8,9-dimethoxycarbonylhexadecanedioic acid and/or ammonium salts thereof, in a ratio of 30 to 60:8 to 20:8 to 20:15 to 30, based on weight, respectively, of the total weight of the dibasic acids. The composition for the electrolytic solution of the present invention can include a small amount of other long chain dibasic acids and/or ammonium salts thereof.

The thus-obtained composition for the electrolytic solution can be dissolved in a solvent such as ethylene glycol and γ-butyrolactone so as to prepare an electrolytic solution for electrolytic capacitors. The preferred solvent is ethylene glycol.

The electrolytic solution for electrolytic capacitors of the present invention includes a mixture of long chain dibasic acids at a suitable concentration, for example, about 0.1 to 15% by weight, preferably about 2 to 12% by weight, and more preferably, about 5 to 10% by weight based on the total weight of the dibasic acids. The electrolytic solution for electrolytic capacitors includes 2-methylnonanedioic acid, 2,4-dimethyl-4-methoxycarbonylundecanedioic acid, 2,4,6-trimethyl-4,6-dimethoxycarbonyltridecanedioic acid and 8,9-dimethyl-8,9-dimethoxycarbonylhexadecanedioic acid and/or ammonium salts thereof, in a ratio of 30 to 60:8 to 20:8 to 20:15 to 30, based on weight, respectively, based on the total weight of the dibasic acids. The electrolytic solution for electrolytic capacitors of the present invention can include a small amount of other long chain dibasic acids such as dodecanedioic acid and 2-butyl octanedioic acid and/or ammonium salts thereof.

As explained above, the mixture of long chain dibasic acids is shown to be a very useful electrolyte for the electrolytic solution for electrolytic capacitors. Further, conventionally used electrolytic solutions for electrolytic capacitors only contain as a electrolyte a long chain dibasic acid having an alkyl group at its side chain, which should be isolated by using many complicated processes. On the contrary, the mixture of long chain dibasic acids of the present invention can be prepared without any isolation process. Therefore, the mixture itself can be used for an electrolytic solution for electrolytic capacitors. Thus, the electrolytic solution for electrolytic capacitors can be very simply produced. Therefore, the present invention is very useful.

EXAMPLES

The present invention will be described in more detail by way of examples. All percentages shown in examples are based on weight.

(Examples 1 to 7: Production of a Mixture of Long Chain Dibasic Acids)

In a reaction vessel equipped with a stirrer, 460 kg of anhydrous methanol anhydride was put, and cooled to 5° C. To this vessel, 80 kg (816 mol) of cyclohexanone and 10 kg of concentrated sulfuric acid were added. To this reaction mixture, 80 kg of 35% aqueous solution of hydrogen peroxide were slowly added while stirring. After the addition of the hydrogen peroxide solution, stirring was conducted for another 10 minutes, maintaining the reaction temperature at 5° C. To this reaction mixture, a predetermined amount of molar ratio of methyl methacrylate, as shown in Table 1, was added. Then, 240 kg of ferrous sulfate 7 $H_2O$ was slowly added to the reaction mixture maintaining the reaction temperature at −5° C. After completion of the reaction, the reaction mixture was left and the upper layer (ester layer) containing ester and the lower layer of ferric salt solution were separated. The ester layer was washed with water and dried, followed by removing unreacted cyclohexanone under reduced pressure (110° C./10 mmHg). By this procedure, a mixture of long chain dibasic acid-esters was obtained. After hydrolysis of the mixture of long chain dibasic acid-esters by the conventional method, 155 kg of a mixture of long chain dibasic acids was obtained (yield: 78.4% molar).

The thus-obtained mixture of long chain dibasic acids was analyzed by gas chromatography. The main components of the mixture of long chain dibasic acids are 2-methylnonanedioic acid (component 1); 2, 4-dimethyl-4-methoxycarbonyl undecanedioic acid (component 2); 2,4,6-trimethyl-4,6-dimethoxycarbonyltridecanedioic acid (component 3); and 8,9-dimethyl-8,9-dimethoxycarbonylhexadecanedioic acid (component 4). These components are contained in the mixture in an amount shown in Table 1. In Example 4, which employs cyclohexanone and methyl methacrylate in an equal molar ratio, these components were contained as follows: component 1, 45.5%; component 2, 13.1%; component 3, 12.6%; component 4, 21.8%. A minor component of 2-methylnonenedioic acid of 1.2% and unknown compounds of 5.8% were also contained. The acid value of each of the mixtures of the long chain dibasic acids is shown in Table 1.

To analyze the mixture of the long chain dibasic acids, the long chain dibasic acids were subjected to methylesterfication. Methylesterification was performed by mixing the above-mentioned long chain dibasic acids with methanol, and the resultant mixture was refluxed for 10 hours in the presence of an acid catalyst (i.e. p-toluene sulfonic acid). The thus-obtained methyl-esters were distributed in diethyl ether. This organic layer was washed with water several times. The methyl-esters were again distributed to the organic layer. The methylesterfied dibasic acids were analyzed by gas chromatography. Gas chromatography was carried out by the following procedures:

device: GC-7A Shimazu Seisakusho Co., Ltd.

column: SE30, 10 m×0.25 mm (inner diameter)

carrier gas: helium gas, 30 ml/min temperature: 120–280° C., 8° C./min detector: FID solutions were measured. Results are shown in Table 2. In Examples 9 to 11, the ammonium salt solutions derived from Examples 1 to 3 were used respectively. In Examples 12 and 13, the ammonium salt solution derived from Example 4 was used. In Examples 14 to 16, the ammonium salt solutions derived from Examples 5 to 7 were used respectively.

(Examples 17 and 18: Production of the Electrolytic Solutions and Performance Thereof)

From the mixture of the long chain dibasic acids obtained in Example 1, 2-methylnonanedioic acid (Component 1) and 2,4-dimethyl-4-methoxycarbonyl undecanedioic acid (Component 2) were isolated by the conventional process. Then, ammonium salts of these compounds were prepared and dissolved in ethylene glycol, thus obtaining solutions each containing 20% of the salt. These solutions were mixed with ethylene glycol in an amount shown in Table 2, thus obtaining an electrolytic solution containing a 10% mixture of ammonium salts of long chain dibasic acids. Using the electrolytic solutions, evaluations were performed as in Examples 9 to 16. Results are shown in Table 2.

(Comparative Examples 1 to 4; Production of the Electrolytic Solutions and Performance Thereof)

From the mixture of the long chain dibasic acids obtained in Example 1, 2-methylnonanedioic acid (Component 1) was isolated by the conventional process. Separately, cyclohexanone was subjected to a reaction under oxidizing and reducing conditions, thus obtaining 2-butyloctanedioic acid (component 5). Then, ammonium salts of these compounds were prepared and dissolved in ethylene glycol respectively, thus obtaining solutions each containing 20% of the salt.

TABLE 1

| Example | molar ratio*[1] | Contents (%) component 1 | component 2 | component 3 | component 4 | acid value (mg KOH/g) | yield (mol %) | cyclo-hexanone | methyl methacrylate |
|---|---|---|---|---|---|---|---|---|---|
| 1 | 1.3 | 42.3 | 15.8 | 16.1 | 18.1 | 401 | 78.5 | 80 (kg) | 106.6 (kg) |
| 2 | 1.2 | 43.0 | 15.4 | 15.0 | 19.6 | 398 | 78.9 | 80 (kg) | 98.4 (kg) |
| 3 | 1.1 | 44.7 | 13.9 | 13.0 | 21.4 | 401 | 78.9 | 80 (kg) | 90.2 (kg) |
| 4 | 1.0 | 45.5 | 13.1 | 12.6 | 21.8 | 402 | 78.4 | 80 (kg) | 82 (kg) |
| 5 | 0.9 | 46.0 | 12.5 | 11.3 | 23.2 | 403 | 79.1 | 80 (kg) | 73.8 (kg) |
| 6 | 0.8 | 48.7 | 11.2 | 9.6 | 23.3 | 409 | 75.5 | 80 (kg) | 65.6 (kg) |
| 7 | 0.7 | 50.7 | 9.5 | 7.9 | 21.7 | 405 | 76.1 | 80 (kg) | 57.4 (kg) |

*[1]molar ratio = methyl methacrylate/cyclohexanone

By changing the molar ratio of methyl methacrylate/cyclohexanone, long chain dibasic acids-mixtures, each having various amounts of the components, were obtained.

(Example 8: Production of Compositions for an Electrolytic Solution)

Five hundred grams of each of the mixtures of long chain dibasic acids of Examples 1 to 7 in Table 1 were dissolved in 2,000 g of ethylene glycol. Ammonia was bubbled into each solution until the pH of the solution became 7.4, so as to obtain an ethylene glycol solution containing 20% of a mixture of ammonium salts of long chain dibasic acids.

Each ethylene glycol solution containing the mixture of ammonium salts of the long chain dibasic acids (i.e., the compositions for an electrolytic solution) was yellow and transparent.

(Examples 9 to 16: Production of the Electrolytic Solutions and Performance Thereof)

Seven kinds of 20% solutions of a mixture of ammonium salts of long chain dibasic acids obtained in Example 8 were provided. A predetermined amount of each of these solutions was mixed with ethylene glycol (EG) as shown in Table 2, thus obtaining 8 kinds of electrolytic solutions, each containing 5% or 10% of the mixture of ammonium salts of the long chain dibasic acids.

Electro-conductivity (mS/cm), spark-over-initiated discharge voltage (Vsp) and water content of the electrolytic Then, predetermined amounts of each of these solutions were mixed with ethylene glycol in an amount shown in Table 2, thus obtaining electrolytic solutions each containing ammonium salts of Component 1 or 5 in an amount shown in Table 2. Using the electrolytic solutions, evaluations were performed as in Examples 9 to 16. Results are shown in Table 2.

TABLE 2

| | ammonium salt (20% conc.) Component | EG Parts | concentration of ammonium salt wt % | mS/cm | Vsp | water content % |
|---|---|---|---|---|---|---|
| Example | | Parts | | | | |
| 9 | Example 1 | 25 | 75 | 5 | 1.43 | 512 | 0.8 |
| 10 | Example 2 | 25 | 75 | 5 | 1.44 | 505 | 0.8 |
| 11 | Example 3 | 25 | 75 | 5 | 1.39 | 515 | 0.9 |
| 12 | Example 4 | 25 | 75 | 5 | 1.45 | 535 | 1.0 |
| 13 | Example 4 | 50 | 50 | 10 | 2.12 | 450 | 1.0 |
| 14 | Example 5 | 25 | 75 | 5 | 1.44 | 430 | 1.1 |

TABLE 2-continued

|  | ammonium salt (20% conc.) Component | Parts | EG Parts | concentration of ammonium salt wt % | mS/ cm | Vsp | water content % |
|---|---|---|---|---|---|---|---|
| 15 | Example 6 | 25 | 75 | 5 | 1.41 | 390 | 1.1 |
| 16 | Example 7 | 25 | 75 | 5 | 1.44 | 395 | 1.2 |
| 17 | Component 1 | 45 | | | | | |
|  | Component 2 | 5 | 50 | 10 | 2.20 | 458 | 0.3 |
| 18 | Component 1 | 40 | | | | | |
|  | Component 2 | 10 | 50 | 10 | 2.19 | 455 | 0.4 |
| Comparative Example | | | | | | | |
| 1 | Component 5*[1] | 25 | 75 | 5 | 1.37 | 370 | 0.8 |
| 2 | Component 5*[1] | 50 | 50 | 10 | 2.12 | 320 | 0.8 |
| 3 | Component 1 | 25 | 75 | 5 | 1.38 | 380 | 0.7 |
| 4 | Component 1 | 50 | 50 | 10 | 1.95 | 367 | 0.8 |

*[1] 2-butyl octanedioic acid

As is apparent from Table 2, in each of the electrolytic solutions of Examples 9 to 18, the spark-over-initiated discharge voltage (Vsp) (high voltage tolerance) is higher and superior to that of the Comparative examples. The electrolytic solution of Comparative examples 1 and 2 contain Component 5 (2-butyloctanedioic acid) but do not contain the long chain dibasic acid having a carbon chain of 8 or more carbon atoms between both its carboxyl groups and having at its side chain an alkyl group and one or more alkoxycarbonyl group. Comparative examples 3 and 4 contain Component 1 (2-methylnonanedioic acid) but do not contain the long chain dibasic acid having a carbon chain of 8 or more carbon atoms between both its carboxyl groups and having at its side chain an alkyl group and one or more alkoxycarbonyl group. On the other hand, each of the electrolytic solutions obtained in Examples 9 to 18 contains at least component 2 in addition to Component 1. Each of the electrolytic solutions obtained in Examples 9 to 16 contains components 2, 3, and 4 in addition to component 1. Component 2 has 9 carbon atoms between both its carboxyl groups and has one methoxycarbonyl groups at its side chain. Component 3 has 11 carbon atoms between both its carboxyl groups and has two methoxycarbonyl groups at its side chain. Component 4 has 14 carbon atoms between both its carboxyl groups and has two methoxycarbonyl groups at its side chain. Each of these dibasic acids, having large carbon numbers between both their carboxyl groups and having one or more methoxycarbonyl group at their side chains, has increased solubility in a solvent. By the use of such dibasic acids, high voltage tolerance of the resultant electrolytic solution can be improved.

Each of the electrolytic solutions of Examples 9 to 16 which contain Components 3 and 4, in addition to Components 1 and 2, has higher voltage tolerance than that of Examples 17 and 18, containing only Component 1 and Component 2.

Except for the electrolytic solution obtained in Example 13 that contains 10% of the mixture of long chain dibasic acids, crystal precipitation from the electrolytic solutions was not observed even when the electrolytic solutions were cooled to 0° C. Since one of the long chain dibasic acids used in the present invention contains a polar group, i.e. an alkoxycarbonyl group, for example, a methoxycarbonyl group as well as an alkyl group (for example, a methyl group) at its side chain, both groups cause the polarization of the molecule, thereby increasing the solubility of the long chain dibasic acid in a solvent such as ethylene glycol.

From Table 2, it is understood that the electrical conductivity of the electrolytic solution can be increased by increasing the concentration of the ammonium salts of long chain dibasic acids.

(Examples 19 to 25)

Electrolytic solutions each containing mixtures of long chain dibasic acids and/or the ammonium salts thereof of Examples 1 to 7 were prepared. Each electrolytic solution contained 5% by weight of the dibasic acid and/or ammonium salt thereof. The electrolytic solution was subjected to the thermal degradation test without any load. That is, each electrolytic solution was maintained at 105° C., for 2,000 hours, and electrical conductivity (mS/cm), water content (%) and the pH of the solution after the 2,000 hour treatment were tested. Results are shown in Table 3.

(Comparative Examples 5 and 6)

An electrolytic solution containing Component 5 and/or the ammonium salt thereof as a solute was prepared (Comparative example 5). Separately, an electrolytic solution containing Component 1 and/or the ammonium salt thereof as a solute was prepared (Comparative example 6). Each electrolytic solution contained 5% by weight of the solute. These electrolytic solutions were evaluated as in Examples 19 to 25. The results are shown in Table 3.

TABLE 3

|  |  | initial | | | after 2000 hours (105° C.) | | |
|---|---|---|---|---|---|---|---|
|  | Component | mS/cm | water content % | pH | mS/cm | water content % | pH |
| Example 19 | Example 1 | 1.43 | 0.78 | 7.41 | 0.92 | 1.30 | 8.61 |
| Example 20 | Example 2 | 1.44 | 0.81 | 7.39 | 0.95 | 1.30 | 8.55 |
| Example 21 | Example 3 | 1.39 | 0.90 | 7.40 | 1.01 | 1.35 | 8.49 |
| Example 22 | Example 4 | 1.45 | 1.01 | 7.42 | 1.14 | 1.23 | 8.57 |
| Example 23 | Example 5 | 1.40 | 1.11 | 7.44 | 1.14 | 1.34 | 8.66 |
| Example 24 | Example 6 | 1.41 | 1.13 | 7.38 | 1.11 | 1.41 | 8.74 |
| Example 25 | Example 7 | 1.44 | 1.21 | 7.40 | 1.09 | 1.45 | 8.77 |
| Comparative Example 5 | Component 5*[1] | 1.37 | 0.79 | 7.32 | 0.78 | 1.65 | 9.00 |
| Comparative Example 6 | Component 1*[2] | 1.38 | 0.77 | 7.31 | 0.77 | 1.85 | 9.30 |

*[1] 2-butyl octanedioic acid
*[2] 2-metyl nonanedioic acid

As is apparent from Table 3, for Comparative examples 5 and 6 the initial electrical conductivity of each of the electrolytic solutions was 1.37 and 1.38 mS/cm respectively; however, after the thermal degradation test, the electrical conductivity was decreased to 0.78 and 0.77 mS/cm. In contrast, the electrical conductivity of the solutions of Examples 19 to 25 was maintained at about 1 mS/cm even after the thermal degradation test. Generally, the water content was increased by the esterification reaction between ethylene glycol and the dibasic acid in the electrolytic solution, and the pH was also raised during the thermal degradation test. The degree of increase of the water content and increase of pH was repressed in the electrolytic solution of the examples as compared to the Comparative examples. Thus, the long-term use of the electrolytic solution of the present invention can be assured.

From these experimental results, it is considered that the chemical stability of the electrolytic solution of the examples may be increased compared to that of the comparative examples. Since each electrolytic solution in the examples contains Components 2 to 4 (i.e., 2,4-dimethyl-4-methoxycarbonylundecanedioic acid, 2,4,6-trimethyl-4,6-dimethoxycarbonyltridecanedioic acid, and 8,9-dimethyl-8,9-dimethoxycarbonylhexadecanedioic acid) as well as Component 1 (2-methylnonanedioic acid), inter-molecular interactions (i.e., repulsion of dipoles, orientation of the molecules and so on) between the components may increase.

(Effect of the Invention)

The electrolytic solution for electrolytic capacitors of the present invention comprises a long chain dibasic acid having an alkyl group at its side chain and/or the ammonium salt thereof, and one or more long chain dibasic acid having 8 or more carbon atoms between both its carboxyl groups and having an alkyl group and one or more alkoxycarbonyl group at its side chain and/or the ammonium salt thereof. The electrolytic solution may not cause any crystallization at low temperatures and is superior in high voltage tolerance. The electrolyte used in the conventional electrolytic solution for electrolytic capacitors is a long chain dibasic acid that is isolated by complicated steps after preparation. In contrast, the mixture of long chain dibasic acids of the present invention can be used in electrolytic solutions for electrolytic capacitors without any isolation. Thus, the electrolytic solution for electrolytic capacitors can be produced by a very simple method.

Various other modifications will be apparent to and can be readily made by those skilled in the art without departing from the scope of this invention. Accordingly, it is not intended that the scope of claims appended hereto be limited to the description as set forth herein, but rather that the claims be broadly construed.

What is claimed is:

1. A composition for an electrolytic solution comprising a mixture of long chain dibasic acids and/or salts thereof,
   wherein the mixture of long chain dibasic acids comprises one or more long chain dibasic acids having an alkyl group at its side chain and one or more long chain dibasic acids having a carbon chain of 8 or more carbon atoms between both its carboxyl groups and having at its side chain an alkyl group and one or more alkoxycarbonyl groups.

2. The composition for an electrolytic solution according to claim 1, wherein the salt is an ammonium salt.

3. The composition for an electrolytic solution according to claim 2, wherein the long chain dibasic acids and/or ammonium salts thereof are dissolved in ethylene glycol.

4. An electrolytic solution for electrolytic capacitors which comprises a mixture of long chain dibasic acids and/or salts thereof,
   wherein the mixture of long chain dibasic acids comprises one or more long chain dibasic acids having an alkyl group at its side chain and one or more long chain dibasic acids having a carbon chain of 8 or more carbon atoms between both its carboxyl groups and having at its side chain an alkyl group and one or more alkoxycarbonyl groups.

5. The electrolytic solution for electrolytic capacitors according to claim 4, wherein the salt is an ammonium salt.

6. The electrolytic solution for electrolytic capacitors according to claim 5, wherein the dibasic acids and/or ammonium salts thereof are dissolved in ethylene glycol.

7. A method for producing an electrolytic solution for electrolytic capacitors, wherein the solution comprises one or more long chan dibasic acid and/or ammonium salt thereof having an alkyl group at its side chain and one or more long chain dibasic acid having a carbon chain of 8 or more carbon atoms between both its carboxyl groups and having at its side chain an alkyl group and one or more alkoxycarbonyl group, and wherein the method comprises the following steps of:
   (1) synthesizing a mixture of long chain dibasic acid-esters by reacting an alkyl-substituted cycloalkanone and an alkyl methacrylate,
   wherein the alkyl-substituted cycloalkanone has the following general formula (I):

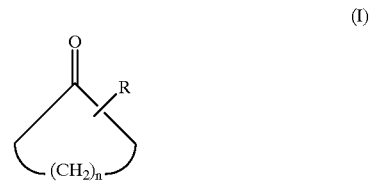

wherein n is an integer of 2 to 4, and R is H or a lower alkyl group having carbon number 1 to 4, wherein the alkyl group can be straight or branched;
   (2) producing a mixture of long chain dibasic acids by hydrolyzing the thus-obtained long chain dibasic acid-esters;
   (3) treating the thus-obtained mixture of long chain dibasic acids with ammonia; and
   (4) dissolving the thus-obtained mixture of long chain dibasic acids and/or ammonium salt thereof in a solvent.

8. A composition for an electrolytic solution comprising a mixture of long chain dibasic acids and/or salts thereof,
   wherein the mixture of long chain dibasic acids is obtained by the following method comprising the steps of:
   (1) reacting hydrogen peroxide and cyclohexanone in methanol in the presence of an acid catalyst;
   (2) reacting methyl methacrylate with the product of step (1) in the presence of a metal salt; and
   (3) hydrolyzing the reaction product of step (2), and
   wherein the mixture contains 2-methyinonanedioic acid, 2,4-dimethyl-4-methoxycarbonylundecanedioic acid, 2,4,6-trimethyl-4,6-dimethoxycarbonyltridecanedioic acid, and 8,9-dimethyl-8,9-dimethoxycarbonylhexadecanedioic acid.

9. An electrolytic solution for electrolytic capacitors which comprises a mixture of long chain dibasic acids and/or salts thereof,
   wherein the mixture of long chain dibasic acids is obtained by the following method comprising the steps of:
   (1) reacting hydrogen peroxide and cyclohexanone in methanol in the presence of an acid catalyst;
   (2) reacting methyl methacrylate with the product of step (1) in the presence of a metal salt; and
   (3) hydrolyzing the reaction product of step (2), and
   wherein the mixture contains 2-methylnonanedioic acid, 2,4-dimethyl-4-methoxycarbonylundecanedioic acid, 2,4, 6-trimethyl-4,6-dimethoxycarbonyltridecanedioic acid, and 8,9-dimethyl-8,9-dimethoxycarbonylhexadecanedioic acid.

10. The electrolytic solution for electrolytic capacitors according to claim 9, wherein the salt is an ammonium salt.

* * * * *